US012669325B2

(12) United States Patent
Song et al.

(10) Patent No.: US 12,669,325 B2
(45) Date of Patent: Jun. 30, 2026

(54) ON-LINE MEASUREMENT-ERROR CORRECTION DEVICE AND METHOD FOR INNER PROFILE OF SPECIAL-SHAPED SHELL

(71) Applicants: SHANDONG UNIVERSITY, Jinan (CN); SHANDONG RESEARCH AND DESIGN INSTITUTE OF INDUSTRIAL CERAMICS CO., LTD., Zibo City (CN)

(72) Inventors: Qinghua Song, Jinan (CN); Xiaojuan Wang, Jinan (CN); Liping Jiang, Zibo City (CN); Hongsheng Wang, Zibo City (CN); Qiang Luan, Zibo City (CN); Zhanqiang Liu, Jinan (CN); Yicong Du, Jinan (CN)

(73) Assignees: SHANDONG UNIVERSITY, Jinan (CN); SHANDONG RESEARCH AND DESIGN INSTITUTE OF INDUSTRIAL CERAMICS CO., LTD., Zibo (CN)

( * ) Notice: Subject to any disclaimer, the term of this patent is extended or adjusted under 35 U.S.C. 154(b) by 752 days.

(21) Appl. No.: 18/184,028

(22) Filed: Mar. 15, 2023

(65) Prior Publication Data

US 2024/0102793 A1     Mar. 28, 2024

(30) Foreign Application Priority Data

Sep. 22, 2022    (CN) .......................... 202211157300.1

(51) Int. Cl.
*G01B 11/24*         (2006.01)
(52) U.S. Cl.
CPC .................................. *G01B 11/24* (2013.01)

(58) Field of Classification Search
None
See application file for complete search history.

(56) References Cited

U.S. PATENT DOCUMENTS

2011/0015885 A1*   1/2011   Matsubara ............. B23Q 17/20
                                                    702/167

FOREIGN PATENT DOCUMENTS

CN          102768028 A  * 11/2012   .......... G01B 21/045
CN          104729416 A  * 6/2015
                    (Continued)

OTHER PUBLICATIONS

CN103307977B translation (Year: 2016).*
                    (Continued)

*Primary Examiner* — Lina Cordero
(74) *Attorney, Agent, or Firm* — Oliff PLC

(57)                ABSTRACT

An on-line measurement-error correction device and method for the inner profile of a special-shaped shell, including a fixing device. A vertical moving device is fixed at the top of the fixing device and connected with a horizontal moving device connected with a distance monitoring device, which is movable vertically and horizontally under the drive of the vertical and horizontal moving devices. The distance monitoring device includes a displacement monitoring element fixedly arranged on a fixing support hinged with an electric push rod configured to displace to drive the displacement monitoring element to deflect so as to change a monitoring direction. The displacement monitoring element is driven to deflect by the electric push rod of the distance monitoring device to change a monitoring direction, and a distance between each longitudinal section surface point on the inner surface of the special-shaped shell and the displacement monitoring element can be gradually measured.

13 Claims, 3 Drawing Sheets

(56) References Cited

FOREIGN PATENT DOCUMENTS

| | | | | | |
|---|---|---|---|---|---|
| CN | 103307977 | B | * | 7/2016 | ............. B23Q 17/20 |
| CN | 107084675 | A | * | 8/2017 | ............. G01B 11/12 |
| CN | 111360584 | A | * | 7/2020 | ............. B23Q 17/20 |
| FR | 3059697 | A1 | * | 6/2018 | ............. E05F 15/63 |

OTHER PUBLICATIONS

CN111360584A translation (Year: 2020).*
CN107084675A translation (Year: 2017).*
CN102768028A translation (Year: 2012).*
CN104729416A translation (Year: 2015).*
FR3059697A1 translation (Year: 2018).*

* cited by examiner

IV-01    IV-02    IV-03    IV-04

IV-09    IV-08    IV-07    IV-06    IV-05

A section of a
special-shaped part $Ri$ $\theta$ $Li$

Laser displacement sensor

ON-LINE MEASUREMENT-ERROR CORRECTION DEVICE AND METHOD FOR INNER PROFILE OF SPECIAL-SHAPED SHELL

TECHNICAL FIELD

The present invention belongs to the technical field of machining of mechanical special-shaped parts, and particularly relates to an on-line measurement-error correction device and method for the inner profile of a special-shaped shell.

BACKGROUND

The statements herein only provide background related to the present invention and do not necessarily constitute the prior art.

Along with continuous development and updating of industrial technologies and equipment, the traditional basic parts and machining methods cannot meet the needs of product functions, and more and more special-shaped parts are designed by industrial software and the like according to use requirements. After being designed, the special-shaped parts then are machined by turning, milling, grinding and the like through complex procedures and special fixtures. The special-shaped parts have high requirements on machining dimension precision and surface quality precision, resulting in the fact that the parts are long in the machining cycle and low in the yield.

Machining cannot avoid mechanical part errors caused by fixture errors, positioning errors, machine tool errors and the like. In order to improve the machining dimension precision, the pass rate and the machining efficiency of the special-shaped parts, higher requirements are proposed for the measurement technology of the machining dimensions of the special-shaped parts. According to the prior measurement and error compensation technologies, generally, after a certain process is completed, the workpiece is taken out from the fixture for measurement and marking, and then put into the fixture again for artificial correction. This mode inevitably introduces other random errors again, such as secondary clamping errors of the fixture.

Measurement and visualization of machining surface dimension precision already become an inevitable trend. The present widely-used measurement modes can be divided into contact measurement and non-contact measurement. Contact measurement is mainly conducted by a coordinate measuring machine or a caliper, a ruler and the like. The coordinate measuring machine and the probe are high in price and large in operation difficulty, and the caliper or the ruler or other manual direct measurement modes is relatively large in measurement deviation. Non-contact measurement mainly includes image vision, laser lattice scanning and industrial CT. The machine vision mode has good measurement precision for the outer profile of the special-shaped part, but is difficult to measure the inner profile precisely, and is difficult to identify the dimension boundary of the workpiece of a material with a light surface color. Measurement devices based on the principle of industrial CT are expensive, are difficult to achieve on-line measurement and inevitably introduce secondary clamping errors.

According to the research on the on-line measurement technology of the special-shaped shell with a cavity, the inventor finds that the prior on-line measurement devices are mostly measurement devices for outer profiles, and when measuring the inner profile, the probe in the contact measurement mode is difficult to penetrate, the machine vision mode is difficult to achieve (insufficient light, and difficulty to determine the reference by photographing), and industrial CT and other devices are mostly used for measurement, but on-line measurement is hard to achieve and the measurement cost is high. Based on comprehensive analysis of the principle of the prior machining dimension measurement device, the prior measurement device has independent functions, that is, non-on-line measurement and difficulty to achieve compensation.

SUMMARY

In view of shortcomings in the prior art, the present invention aims to provide an on-line measurement-error correction device and method for the inner profile of a special-shaped shell. In the device, a displacement monitoring element is driven by an electric push rod of a distance monitoring device to deflect so as to change a monitoring direction, a distance between each longitudinal section surface point on the inner surface of the special-shaped shell and the displacement monitoring element can be gradually measured, and closed-loop manufacturing of machining-measurement-compensation machining for precise machining of the inner profile of the special-shaped shell can be achieved.

In order to achieve the above purposes, the present invention is realized by the following technical solution.

In the first aspect, the present invention provides an on-line measurement-error correction device for the inner profile of a special-shaped shell, which includes a fixing device. A vertical moving device is fixed at the top of the fixing device, the vertical moving device is connected with a horizontal moving device, the horizontal moving device is connected with a distance monitoring device, and the distance monitoring device is movable vertically and horizontally under the drive of the vertical and horizontal moving device; and the distance monitoring device includes a displacement monitoring element, the displacement monitoring element is fixedly arranged on a fixing support, the fixing support is hinged with an electric push rod, and the electric push rod configured to displace to drive the displacement monitoring element to deflect so as to change a monitoring direction.

As a further technical solution, the fixing support is connected with a supporting connecting rod through a ball head connecting rod, and the supporting connecting rod and the electric push rod are both connected with the horizontal moving device so as to drive the displacement monitoring element to move horizontally.

As a further technical solution, the vertical moving device includes a first ball screw arranged vertically, the first ball screw is connected with a moving slider, the first ball screw is connected with a supporting plate through a cover plate, the supporting plate is arranged in parallel with the ball screw, and the moving slider is connected with the horizontal moving device.

As a further technical solution, the side part of the first ball screw is provided with a polished rod guide rail, the polished rod guide rail is arranged in parallel with the first ball screw, the polished rod guide rail is connected with the moving slider in a sliding manner, and the supporting plate is provided with a slot for enabling the horizontal moving device to pass through.

As a further technical solution, the horizontal moving device includes a second ball screw arranged horizontally, the second ball screw is connected with a screw slider, a screw guide rail is arranged at the side part of the second ball screw, the screw guide rail is arranged in parallel with the second ball screw, and the screw slider is connected with the screw guide rail in a sliding manner.

As a further technical solution, the fixing device includes a bottom plate connected with the vertical moving device, a plurality of threaded adjustable supporting screws are arranged at the bottom of the bottom plate, the threaded adjustable supporting screws are connected with threaded adjustable supporting nuts, and the bottom plate is of a triangular structure.

In the second aspect, the present invention also provides a working method for the on-line measurement-error correction device for the inner profile of a special-shaped shell, including:

in the process of machining the special-shaped part by a machine tool, positioning an initial monitoring position of the distance monitoring device through the vertical moving device and the horizontal moving device;

driving the special-shaped part to rotate by the machine tool, collecting, a distance between the element and circumferential surface points of the longitudinal section on the inner surface of the special-shaped part, by the displacement monitoring element, then driving the displacement monitoring element to deflect and continue to collect the distance values by the electric push rod, and collecting a distance between each longitudinal section surface point on the inner surface of the special-shaped part and the displacement monitoring elements in layers; and converting the collected distance values to the three-dimensional coordinates of discrete points, and conducting three-dimensional reconstruction of the actual machining dimension of the inner profile based on T-spline surface reconstruction under multi-point constraint.

As a further technical solution, during positioning, the fixing device is configured to adjust levelness, the monitoring direction of the displacement monitoring element is adjusted to be vertical to the electric push rod, and the vertical moving device and the horizontal moving device are adjusted to drive light emitted by the displacement monitoring element to coincide with the axis of the special-shaped part fixture, so that measurement positioning is completed.

As a further technical solution, during three-dimensional coordinate conversion, the rotating angle of the displacement monitoring element, when a distance value between a point on a certain discrete layer and the displacement monitoring element is measured, is calculated through the moving distance of the electric push rod, and coordinate conversion is carried out according to the angle, so that the three-dimensional coordinates of the discrete points on the surface of the inner profile are obtained.

As a further technical solution, after three-dimensional reconstruction, a position error of actual measurement data is separated through an iterative closest point algorithm for error evaluation, Boolean operation is carried out on dimensions of an inner profile dimension reconstruction model under actual machining and a theoretical model to obtain an error model, and a machining program is generated for the error model for error correction.

The device and method of the present invention have the following beneficial effects:

According to the on-line measurement-error correction device for the inner profile of a special-shaped shell of the present invention, a multi-connecting rod structure designed based on the electric push rod drives the displacement monitoring element to move and is matched with rotation of a workpiece driven by the machine tool worktable. A distance value between the displacement monitoring element and a surface point on the inner surface of the workpiece is collected, the distance value collection precision is high, on-line measurement can be achieved, and errors are prevented from being introduced again.

According to the on-line measurement-error correction device for the inner profile of a special-shaped shell of the present invention, the electric push rod displaces to drive the displacement monitoring element to deflect, so that a distance between each longitudinal section surface point on the inner surface of the special-shaped shell and the displacement monitoring element can be gradually measured. The operation is convenient, the measurement is carried out in the special-shaped part machining process, and integral special-shaped part machining of machining-measurement-compensation can be achieved.

According to a working method for an on-line measurement-error correction device for the inner profile of a special-shaped shell of the present invention, when the machine tool drives the special-shaped part to rotate, the displacement monitoring element collects a distance between the element and circumferential surface points of the longitudinal section on the inner surface of the special-shaped part. Then the electric push rod drives the displacement monitoring element to deflect and continue to collect the distance values. A distance between each longitudinal section surface point on the inner surface of the special-shaped part and the displacement monitoring elements is collected in layers. Therefore, on-line measurement and error display of the machining dimensions of the inner profile of the special-shaped part can be conveniently achieved.

According to the working method for an on-line measurement-error correction device for the inner profile of a special-shaped shell of the present invention, through coordinate conversion, the measured distance value is converted to a space three-dimensional point coordinate, and the space three-dimensional point is used for three-dimensional surface fitting so as to obtain the space three-dimensional surface of the inner profile under actual machining. Three-dimensional measurement point data is subjected to error evaluation through T-spline surface reconstruction under multi-point constraint and an iterative closest point (ICP) algorithm, fitting and error evaluation at a micron level can be achieved, the measurement precision is high, a machining program is programmed for machining errors, an error correction program is obtained, and error compensation of the machining dimension of the inner profile of the special-shaped part is achieved.

BRIEF DESCRIPTION OF THE DRAWINGS

The description drawings, which constitute a part of the present invention, and are provided for a further understanding of the present invention, and illustrative embodiments and the descriptions thereof are used to explain the present invention and do not constitute improper limits to the present invention.

In the figures, the spacing or the dimension between parts is enlarged to show the position of each part, and the figures are only used for illustration.

I fixing device, II vertical moving device, III horizontal moving device, IV distance monitoring device, V special-shaped part;

I-01—bottom plate, I-02—threaded adjustable supporting screw, I-03—threaded adjustable supporting nut, I-04—hexagon bolt;

II-01—hex socket head bolt, II-02—supporting plate, II-03—hex socket head bolt, II-04—lower cover plate, II-05—hex socket head bolt, II-06—stepping motor, II-07—coupling, II-08—thrust bearing, II-09—polished rod guide rail, II-10—moving slider, II-11—ball screw, II-12—thrust bearing, II-13—upper cover plate;

III-01—stepping motor, III-02—motor support, III-03—coupling, III-04—hex socket head bolt, III-05—hex socket head bolt, III-06—screw guide rail, III-07—screw slider, III-08—front cover plate, III-09—hex socket head bolt, III-10—rolling bearing, III-11—ball screw, III-12—rolling bearing, III-13—rear cover plate, III-14—hex socket head bolt, III-15—hex socket head bolt; and IV-01—hex socket head bolt, IV-02—electric push rod, IV-03—cylindrical pin, IV-04—displacement monitoring element, IV-05—displacement monitoring element fixing support, IV-06—ball head connecting rod, IV-07—hex socket head bolt, IV-08—supporting connecting rod, and IV-09—hex socket head bolt.

DETAILED DESCRIPTION

It should be indicated that the following detailed description is exemplary and is intended to provide further description of the present invention. Unless otherwise indicated, all technical and scientific terms used herein have the same meanings as commonly understood by those of ordinary skill in the art to which the present invention belongs.

Embodiment 1

Figure 1:
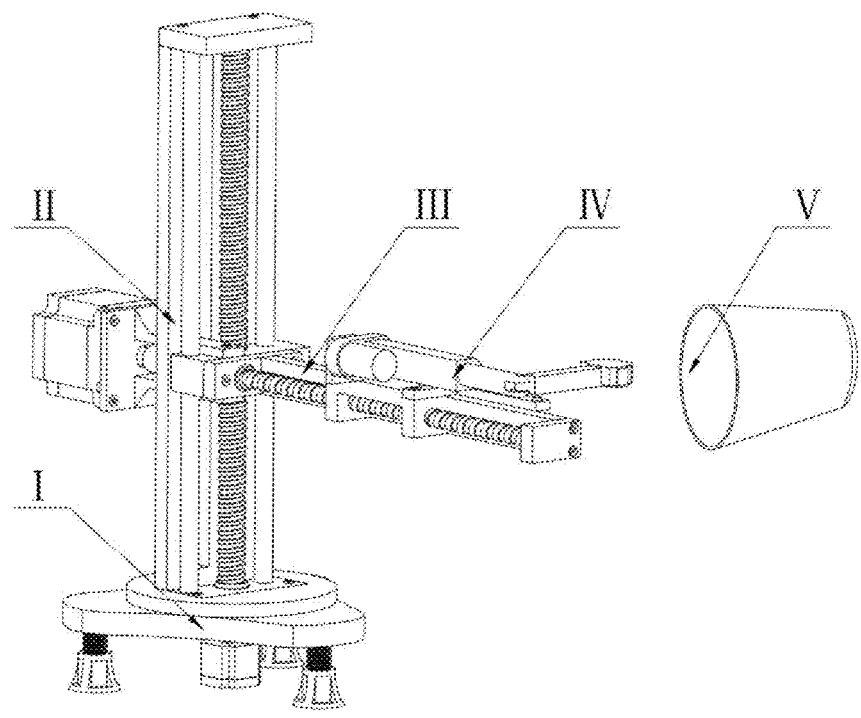
FIG. 1 is an axonometric view of an on-line measurement-error correction device for the inner profile of a special-shaped shell of the present invention.

In a typical implementation of the present invention, as shown in FIG. 1, an on-line measurement-error correction device for the inner profile of a special-shaped shell is provided and includes a fixing device I, a vertical moving device II, a horizontal moving device III and a distance monitoring device IV. The vertical moving device II is located above the fixing device I, the horizontal moving device III is fixed on the vertical moving device II and is crosswise arranged, and the distance monitoring device IV is fixed at one end of the horizontal moving device III.

The fixing device ensures the whole levelness of the device by a threaded adjustable supporting structure.

An initial monitoring position of the distance monitoring device is positioned through the vertical moving device and the horizontal moving device.

The horizontal moving device drives a connecting rod structure by an electric push rod to further drive a displacement monitoring element to move, and is matched with a machine tool to drive a workpiece to move, thereby achieving measurement and collection of a three-dimensional distance between the displacement monitoring element and a discrete point on the surface of the inner profile of a special-shaped part.

As shown in FIG. 1, the vertical moving device II is supported by the fixing device I, and is fixed on a bottom plate I-01 in the fixing device I through a hex socket head bolt II-03 and a lower cover plate II-04; the horizontal moving device III and the vertical moving device II are crosswise arranged, and a supporting plate II-02 in the vertical moving device II is provided with a slot, thereby facilitating movement of the horizontal moving device III. The horizontal moving device III is fixed on a moving slider II-10 of the vertical moving device through a rear cover plate III-13 and a hex socket head bolt III-05, thereby ensuring the whole horizontal moving device can be driven by the vertical moving device to move without interference. The distance monitoring device is fixed on a screw slider III-07 of the horizontal moving device through a hex socket head bolt IV-01, thereby ensuring the horizontal moving device drives the displacement monitoring element to carry out positioning in the horizontal direction.

Figure 2:
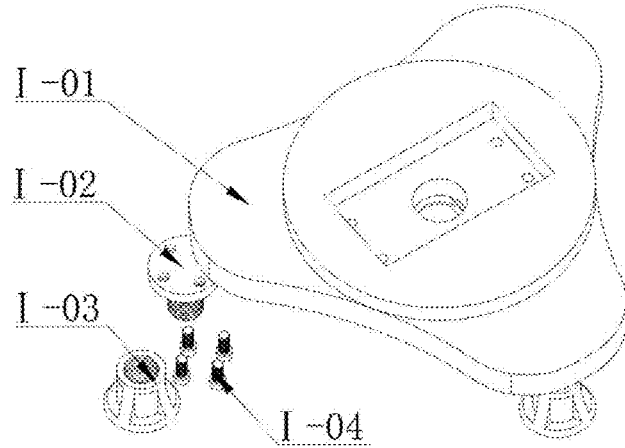
FIG. 2 is an exploded view of a fixing device of the present invention.

As shown in FIG. 2, the fixing device I ensures the levelness of the whole device through a threaded adjustable support, and is mainly composed of the bottom plate I-01, a threaded adjustable supporting screw I-02 and a threaded adjustable supporting nut I-03. The threaded adjustable supporting screw I-02 is fixed on the bottom plate I-01 through a hex socket head bolt I-04. The bottom plate I-01 is provided with a motor support and a groove. The bottom plate is made of cast iron, stability of the whole device is ensured, and errors caused by vibration are avoided.

In this embodiment, the overall shape of the bottom plate I-01 is triangular, a round table is arranged in the middle of the bottom plate to be connected with the vertical moving device II, and a groove is arranged in the round table to provide an installation space for the vertical moving device II. The bottom plate is arranged in a triangular shape, so that supporting stability for the moving device can be improved. Corners and corner joints of the bottom plate can be arranged in an arc shape, so that the bottom plate is smooth as a whole, and damages to operators during installation and monitoring are avoided.

Threaded adjustable supporting screws I-02 are fixedly arranged at three corners of the bottom plate I-01. The threaded adjustable supporting screws I-02 are provided with external threads. Threaded adjustable supporting nuts I-03 are provided with internal threads. The threaded adjustable supporting screws I-02 are connected with the threaded adjustable supporting nuts I-03 through threads, and through adjusting the connection positions of the threaded adjustable supporting screws and the threaded adjustable supporting nuts, the levelness of the bottom plate is adjusted.

Figure 3:
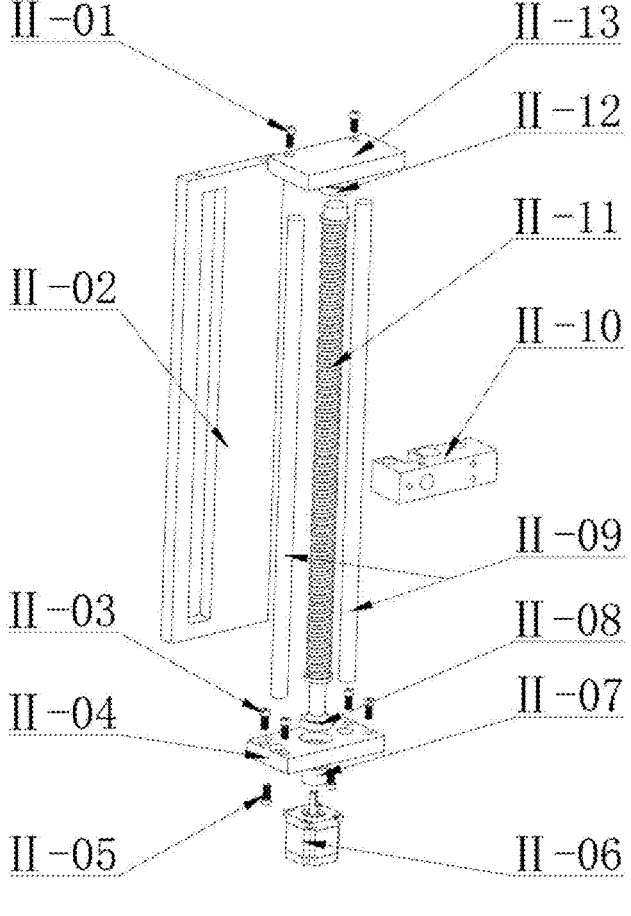
FIG. 3 is an exploded view of a vertical moving device of the present invention.

As shown in FIG. 3, the vertical moving device II, designed based on the screw slider structure, is configured to position the displacement monitoring element in the vertical direction. The vertical moving device II includes a ball screw II-11 arranged vertically. One end of the ball screw II-11 is fixed on an upper cover plate II-13 through a thrust bearing II-12. The upper cover plate II-13 is fixed on the upper part of the supporting plate II-02 through a hex socket head bolt II-01. The other end of the ball screw II-11 is fixed on a lower cover plate II-04 through a thrust bearing II-08. The lower cover plate II-04 is fixed on the lower part of the supporting plate II-02 through a hex socket head bolt II-05. The ball screw II-11 is connected with a stepping motor II-06 through a coupling II-07. The stepping motor II-06 is connected to the bottom plate I-01 through the hex socket head bolt. The whole vertical moving device is fixed on a groove of the bottom plate I-01 through the lower cover plate II-04 and the hex socket head bolt II-03. The moving slider II-10 is matched with the ball screw II-11. A polished rod guide rail II-09 is configured to position the moving slider to ensure that the moving slider moves along the axis of the ball screw without deflection.

The polished rod guide rail II-09 is arranged at the side of the ball screw II-11 and is parallel to the ball screw II-11. The moving slider II-10 is connected with the polished rod guide rail II-09 and the ball screw II-11. The moving slider II-10 is driven to move vertically by the ball screws II-11.

The supporting plate II-02 is parallel to the ball screw II-11, and the supporting plate II-02 is provided with a slot. Therefore, the horizontal moving device III can move up and down through the slot.

Figure 4:
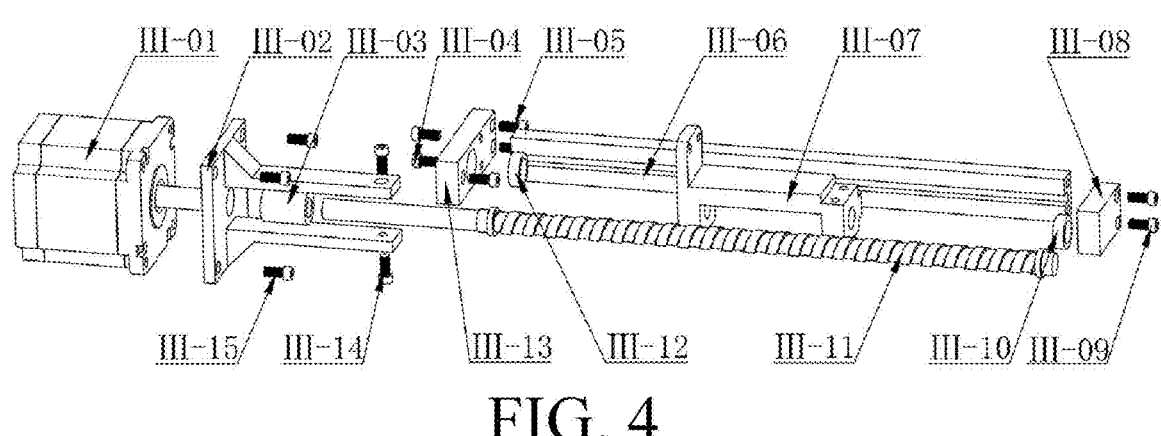
FIG. 4 is an exploded view of a horizontal moving device of the present invention.

As shown in FIG. 4, the horizontal moving device III, also designed based on the screw slider structure, is mainly configured to position the horizontal position of the displacement monitoring element. The horizontal moving device III includes a ball screw III-11 arranged horizontally. One end of the ball screw III-11 is fixed on a front cover plate III-08 through a rolling bearing III-10. The front cover plate III-08 is fixed on the right end face of a screw guide rail III-06 through a hex socket head bolt III-09. The other end of the ball screw III-11 is fixed on the rear cover plate III-13 through a rolling bearing III-12. One side surface of the rear cover plate III-13 is fixed on the left end surface of the screw guide rail III-06 through a hex socket head bolt III-04, and the other side surface is fixed on the moving slider II-10 in the vertical moving device through a hex socket head bolt III-05. The ball screw III-11 is connected with a stepping motor III-01 through a coupling III-03. The stepping motor III-01 is fixed on a motor support III-02 through a hex socket head bolt III-15. The motor support III-02 is fixed on the moving slider II-10 in the vertical moving device through a hex socket head bolt III-14. Therefore, the horizontal moving device III can move up and down along with the moving slider II-10.

The screw slider III-07 is matched with the ball screw III-11. The ball screw III-11 drives the screw slider III-07 to move horizontally. The screw guide rail III-06 is arranged at the side part of the ball screw III-11. The screw guide rail III-06 is arranged in parallel with the ball screw III-11. The screw slider III-07 is provided with a threaded hole and a rectangular protrusion on the side, and the rectangular protrusion is matched with the rectangular groove in the screw guide rail III-06 to ensure that the screw slider does not rotate when moving along the axis.

Figure 5:
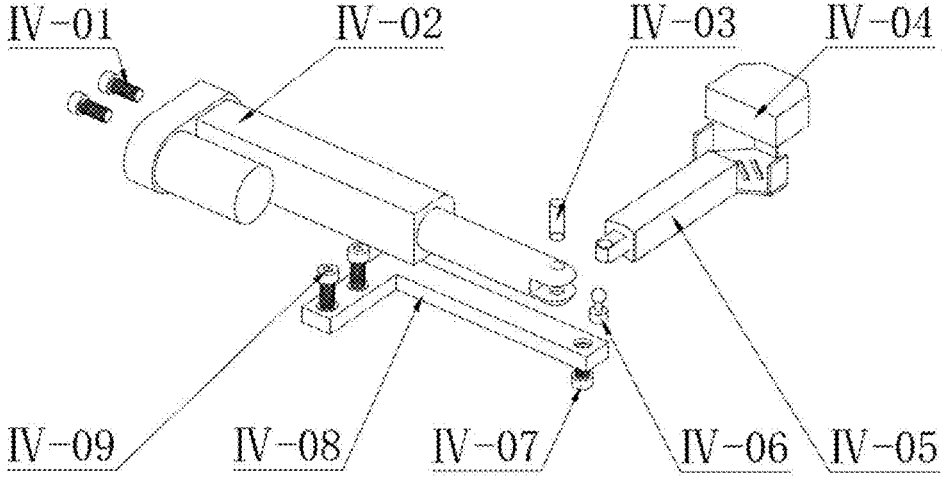
FIG. 5 is an exploded view of a distance monitoring device of the present invention.

As shown in FIG. 5, the distance monitoring device, designed based on the multi-connecting rod structure, is mainly configured to move the position of the displacement monitoring element after positioning. A displacement monitoring element IV-04 is fixed on a displacement monitoring element fixing support IV-05. A spherical cavity track is arranged on the side surface of one section of the displacement monitoring element fixing support IV-05 and is matched with a ball head connecting rod IV-06, so that the matched ball head connecting rod can move along the axial direction and can also rotate in the displacement monitoring element fixing support IV-05. The ball head connecting rod IV-06 is fixed on the supporting connecting rod IV-08 through the hex socket head bolt IV-07. The other end of the supporting connecting rod IV-08 is fixed on the screw slider III-07 through a hex socket head bolt IV-09. The other end of the displacement monitoring element fixing support IV-05 is connected with an electric push rod IV-02 through a cylindrical pin IV-03. The electric push rod IV-02 is fixed on the screw slider III-07 through a hex socket head bolt IV-01. The whole distance monitoring device can move horizontally along with the screw slider III-07.

In the initial state, the electric push rod IV-02 is vertical to the displacement monitoring element fixing support IV-05. The monitoring direction of the displacement monitoring element IV-04 is vertical to the electric push rod IV-02. The electric push rod IV-02 acts to push the displacement monitoring element fixing support IV-05 to swing. Therefore, the displacement monitoring element IV-04 can change the monitoring direction.

In this embodiment, the displacement monitoring element adopts a laser displacement sensor. Laser measurement is not affected by poor light transmission of the inner profile and the surface color of the workpiece material, and can simply achieve high-precision measurement.

Compared with industrial CT, machine vision and other measurement modes in which machine vision measurement cannot realize measurement of the inner profile, and the industrial CT equipment has high price and is difficult to operate. The device of the present invention has the advantages of simple operation, high efficiency, low cost, easy maintenance and the like.

By the device of the present invention, the pass rate of the machined special-shaped part products can be effectively ensured, the energy waste is avoided, and the economic benefit is improved.

Embodiment 2

A working method for a machining-on-line measurement-error correction device for the inner profile of a special-shaped shell provided in this embodiment mainly includes performing coordinate conversion on the collected values of the distances of the discrete points on the surface, surface fitting of three-dimensional coordinates of discrete points, error evaluation and the like, and performing error compensation after an error model is obtained.

Figure 6:
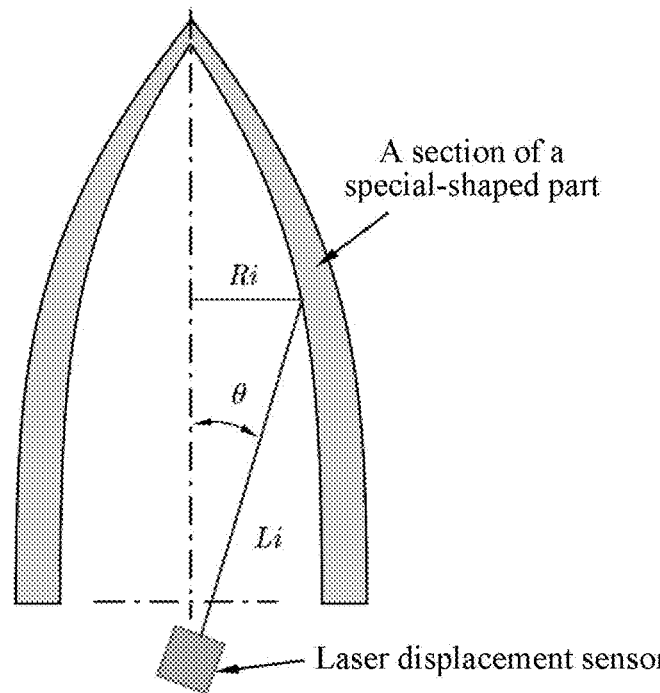
FIG. 6 is a schematic view of coordinate conversion by measuring a distance value of the present invention.

As shown in FIG. 6, the working method for the machining-on-line measurement-error correction device for the inner profile of a special-shaped shell includes:

S1: the distance monitoring device is initialized. In the process of machining the special-shaped part V by the machine tool, the machine tool is stopped after a certain process is completed. The whole device is placed on one side of the machine tool. The threaded adjustable supporting structure in the fixing device is adjusted until the whole device is in horizontal level. The displacement monitoring element is adjusted to be vertical to the electric push rod, that is, the monitoring direction of the displacement monitoring element is ensured to be vertical to the shaft of the electric push rod (that is, the light emitted by the displacement monitoring element is vertical to the shaft of the electric push rod). The vertical moving device and the horizontal moving device are adjusted to drive the light emitted by the displacement monitoring element to coincide with the axis of the special-shaped part fixture. Measurement and positioning are completed. The computer controls the stepping motor to achieve control of the adjusting process.

S2: measurement is performed. The displacement monitoring element is programmed and processed by the controller to control the displacement monitoring element to intermittently collect data. A machine tool program is written to ensure that the machine tool worktable intermittently move in a cycle of 360 degrees. When the measurement starts, the displacement monitoring element starts to collect the distance between the element and the surface point on the inner surface of the special-shaped part. At the same time, the machine tool drives the workpiece to rotate slowly. When the workpiece rotates for a circumference, the displacement monitoring element stops collecting, so as to collect the distance between a circumferential surface point of a longitudinal section (that is, a section vertical to the axial direction) of the inner surface of the special-shaped part and the displacement monitoring element. Then the electric push rod moves a micro distance, so that the displacement monitoring element fixing support deflects. The displacement monitoring element deflects under the drive of the connecting rod mechanism. The light emitted by the displacement monitoring element deflects to form an included angle with the initial position. The end point of the light moves a micro distance in the inner profile. The machine tool rotates and the displacement monitoring element collects data again. The distance values between the surface point on the annular circumference at the position of the special-shaped part inner profile and the displacement monitoring element are collected. The above process is repeated until collection of the distance value between the surface point of each longitudinal section of the whole inner profile and the displacement monitoring element is completed.

During measurement, the special-shaped part is kept at the original position of the machine tool fixture and is driven by the machine tool worktable to carry out intermittent 360-degree periodic rotation.

S3: measurement data is processed. The collected distance value is converted to three-dimensional coordinates of a discrete point. Three-dimensional reconstruction of the actual machining dimension of the inner profile is conducted based on T-spline surface reconstruction under multi-point constraint in a processing system. A position error of actual measurement data is separated through an iterative closest point (ICP) algorithm to perform error evaluation, and the position and distribution of the machining error are shown by the shade of color in the computer control system.

Three-dimensional measurement point data can fit the three-dimensional surface model of the inner profile through the T-spline surface reconstruction principle under multi-point constraint. The iterative closest point (ICP) algorithm is adopted to achieve precise registration among point sets and separate the position error of the actual measurement data, thereby achieving micron-level fitting precision and high-precision error evaluation.

S4: machining error compensation is performed. Boolean operation is carried out on dimensions of an inner profile dimension reconstruction model under actual machining and a theoretical model to obtain an error model. The machining program of the error model is programmed and imported into the machine tool for error correction. Finally, on-line measurement and error compensation of the machining dimension of the inner profile of the special-shaped part are achieved.

The displacement monitoring element is driven by the electric push rod and the connecting rod structure to deflect a micro angle each time, which ensures that the displacement monitoring element only moves a micro distance to the outer end surface of the cavity of the inner profile at a new collection position of the inner profile compared with the original position, so as to perform layered collection on the inner profile.

Preferably, the displacement monitoring element is externally connected with a special transformer, the measurement data is transmitted to a computer through a controller, the controller of the displacement monitoring element is programmed, and the sampling frequency of the displacement monitoring element is controlled to carry out intermittent data collection. Due to the high collection frequency of the displacement monitoring element, the average value of the data collected by the displacement monitoring element in each intermittent interval is the distance value between the displacement monitoring element and the surface point on the inner profile.

Preferably, when three-dimensional coordinate conversion is carried out, as a certain included angle is formed between the light emitted by the displacement monitoring element and the axial direction of the special-shaped part, a three-dimensional coordinate value cannot be got. Therefore, coordinate conversion is carried out: the rotating angle of the laser displacement sensor, when a distance between a point on a certain discrete layer and the sensor is measured, can be calculated through the moving distance of the electric push rod, so that three-dimensional coordinates of the discrete points on the surface of the inner profile are obtained by coordinate conversion with the angle. Specifically, the moving distance $l_i$ of the electric push rod is sent by the control program, the linear relationship between $l_i$ and $d_i$ can be obtained by measuring the moving distance $d_i$ of the ball head connecting rod on the laser displacement sensor for many times, so that the deflection angle $\theta$ of the laser displacement sensor can be calculated. As seen from the schematic view of coordinate conversion of FIG. 6, the relationship between the distance $L_i$ from the displacement monitoring element to a certain point on the inner surface of the special-shaped part and the deflection angle $\theta$ is sin $\theta=R_i/L_i$, and $R_i$ is the polar radius under the polar coordinate. Through rotation of the workpiece, the deflection angle, namely the polar angle, of the measurement position from the initial position, can be calculated. Therefore, the polar coordinates of the point can be obtained. In combination with the initial position, the height information of the cross section of the layer can be calculated, so the polar coordinates of the point can be converted to three-dimensional coordinates.

Operation of the whole device and display of the data are achieved through the control interface of the calculator.

The above is only a preferred embodiment of the present invention and is not intended to limit the present invention, and is susceptible to various modifications and variations for those skilled in the art. Any modification, equivalent substitution, improvement and the like within the spirit and principle of the present invention should be included in the protection scope of the present invention.

What is claimed is:

1. An on-line measurement-error correction device for generating an inner profile of a conical-shaped part, the on-line measurement-error correction device comprising:
 a fixing device, wherein
 a vertical moving device is fixed at a top of the fixing device, the vertical moving device being connected with a horizontal moving device,
 the horizontal moving device is connected with a distance monitoring device, the distance monitoring device is movable vertically and horizontally under a drive of the vertical moving device and a drive of the horizontal moving device, the distance monitoring device comprises a displacement monitoring element, the displacement monitoring element is fixedly arranged on a fixing support, the fixing support is hinged with an electric push rod, the electric push rod is configured to drive the displacement monitoring element to change a monitoring direction, the fixing support is connected with a supporting connecting rod through a ball head connecting rod, and the supporting connecting rod and the electric push rod are both connected with the horizontal moving device to drive the displacement monitoring element to move horizontally.

2. The on-line measurement-error correction device for generating the inner profile of the conical-shaped part according to claim 1, wherein the vertical moving device comprises a first ball screw arranged vertically, the first ball screw is connected with a moving slider, the first ball screw is connected with a supporting plate through a cover plate, the supporting plate is arranged in parallel with the first ball screw, and the moving slider is connected with the horizontal moving device.

3. The on-line measurement-error correction device for generating the inner profile of the conical-shaped part according to claim 2, wherein a side part of the first ball screw is provided with a polished rod guide rail, the polished rod guide rail is arranged in parallel with the first ball screw, the polished rod guide rail is connected with the moving slider in a sliding manner, and the supporting plate is provided with a slot for enabling the horizontal moving device to pass through.

4. A working method for the on-line measurement-error correction device for generating the inner profile of the conical-shaped part according to claim 3 comprising:

in a process of machining the conical-shaped part by a machine tool, positioning an initial monitoring position of the distance monitoring device through the vertical moving device and the horizontal moving device;

driving the conical-shaped part to rotate by the machine tool, collecting, a distance between the displacement monitoring element and circumferential surface points of a longitudinal section on an inner surface of the conical-shaped part, by the displacement monitoring element, then driving the displacement monitoring element to deflect and continue to collect distance values by the electric push rod, and collecting the distance between each longitudinal section surface point on the inner surface of the conical-shaped part and the displacement monitoring element in layers; and converting the distance values to three-dimensional coordinates of discrete points, and conducting three-dimensional reconstruction of actual machining dimension of the inner profile based on T-spline surface reconstruction under multi-point constraint.

5. A working method for the on-line measurement-error correction device for generating the inner profile of the conical-shaped part according to claim 2 comprising:

in a process of machining the conical-shaped part by a machine tool, positioning an initial monitoring position of the distance monitoring device through the vertical moving device and the horizontal moving device;

driving the conical-shaped part to rotate by the machine tool, collecting, a distance between the displacement monitoring element and circumferential surface points of a longitudinal section on an inner surface of the conical-shaped part, by the displacement monitoring element, then driving the displacement monitoring element to deflect and continue to collect distance values by the electric push rod, and collecting the distance between each longitudinal section surface point on the inner surface of the conical-shaped part and the displacement monitoring element in layers; and converting the distance values to three-dimensional coordinates of discrete points, and conducting three-dimensional reconstruction of actual machining dimension of the inner profile based on T-spline surface reconstruction under multi-point constraint.

6. The on-line measurement-error correction device for generating the inner profile of the conical-shaped part according to claim 1, wherein the horizontal moving device comprises a second ball screw arranged horizontally, the second ball screw is connected with a screw slider, a screw guide rail is arranged at a side part of the second ball screw, the screw guide rail is arranged in parallel with the second ball screw, and the screw slider is connected with the screw guide rail in a sliding manner.

7. A working method for the on-line measurement-error correction device for generating the inner profile of the conical-shaped part according to claim 6 comprising:

in a process of machining the conical-shaped part by a machine tool, positioning an initial monitoring position of the distance monitoring device through the vertical moving device and the horizontal moving device;

driving the conical-shaped part to rotate by the machine tool, collecting, a distance between the displacement monitoring element and circumferential surface points of a longitudinal section on an inner surface of the conical-shaped part, by the displacement monitoring element, then driving the displacement monitoring element to deflect and continue to collect distance values by the electric push rod, and collecting the distance between each longitudinal section surface point on the inner surface of the conical-shaped part and the displacement monitoring element in layers; and converting the distance values to three-dimensional coordinates of discrete points, and conducting three-dimensional reconstruction of actual machining dimension of the inner profile based on T-spline surface reconstruction under multi-point constraint.

8. The on-line measurement-error correction device for generating the inner profile of the conical-shaped part according to claim 1, wherein the fixing device comprises a bottom plate connected with the vertical moving device, a plurality of threaded adjustable supporting screws are arranged at a bottom of the bottom plate, each of the plurality of threaded adjustable supporting screws are connected with threaded adjustable supporting nuts, and the bottom plate is of a triangular structure" in order to provide appropriate antecedence basis.

9. A working method for the on-line measurement-error correction device for generating the inner profile of the conical-shaped part according to claim 8 comprising:

in a process of machining the conical-shaped part by a machine tool, positioning an initial monitoring position of the distance monitoring device through the vertical moving device and the horizontal moving device;

driving the conical-shaped part to rotate by the machine tool, collecting, a distance between the displacement monitoring element and circumferential surface points of a longitudinal section on an inner surface of the conical-shaped part, by the displacement monitoring element, then driving the displacement monitoring element to deflect and continue to collect distance values by the electric push rod, and collecting the distance between each longitudinal section surface point on the inner surface of the conical-shaped part and the displacement monitoring element in layers; and converting the distance values to three-dimensional coordinates of discrete points, and conducting three-dimensional reconstruction of actual machining dimension of the inner profile based on T-spline surface reconstruction under multi-point constraint.

10. A working method for the on-line measurement-error correction device for generating the inner profile of the conical-shaped part according to claim 1 comprising:

in a process of machining the conical-shaped part by a machine tool, positioning an initial monitoring position of the distance monitoring device through the vertical moving device and the horizontal moving device;

driving the conical-shaped part to rotate by the machine tool, collecting, a distance between the displacement monitoring element and circumferential surface points of a longitudinal section on an inner surface of the conical-shaped part, by the displacement monitoring element"

in order to provide appropriate antecedence basis, then driving the displacement monitoring element to deflect and continue to collect distance values by the electric push rod, and collecting the distance between each longitudinal section surface point on the inner surface of the conical-shaped part and the displacement monitoring element in layers; and converting the distance values to three-dimensional coordinates of discrete points, and conducting three-dimensional reconstruction of actual machining dimension of the inner profile based on T-spline surface reconstruction under multi-point constraint.

11. The working method according to claim 10, wherein during the positioning, the fixing device is configured to adjust levelness, the monitoring direction of the displacement monitoring element is adjusted to be vertical to the electric push rod, and the vertical moving device and the horizontal moving device are adjusted to drive light emitted by the displacement monitoring element to coincide with an axis of the conical-shaped part, so that measurement positioning is completed.

12. The working method according to claim 10, wherein during three-dimensional coordinate conversion, a rotating angle of the displacement monitoring element, when a distance value between a point on a certain discrete layer and the displacement monitoring element is measured, is calculated through a moving distance of the electric push rod, and the three-dimensional coordinate conversion is carried out according to the rotating angle, so that the three-dimensional coordinates of the discrete points on a surface of the inner profile are obtained.

13. The working method according to claim 10, wherein after the three-dimensional reconstruction, a position error of actual measurement data is separated through an iterative closest point algorithm for error evaluation, Boolean operation is carried out on dimensions of an inner profile dimension reconstruction model under actual machining and a theoretical model to obtain an error model, and a machining program is generated for the error model for error correction.

* * * * *